Feb. 28, 1933.    J. B. BRENNEN    1,899,791
RETURN TYPE RAKE DISTRIBUTOR AND ELECTRIC CONTROL
Filed Sept. 19, 1930    3 Sheets-Sheet 1

JOHN B. BRENNEN
INVENTOR

BY Victor J. Evans
ATTORNEY

WITNESS:

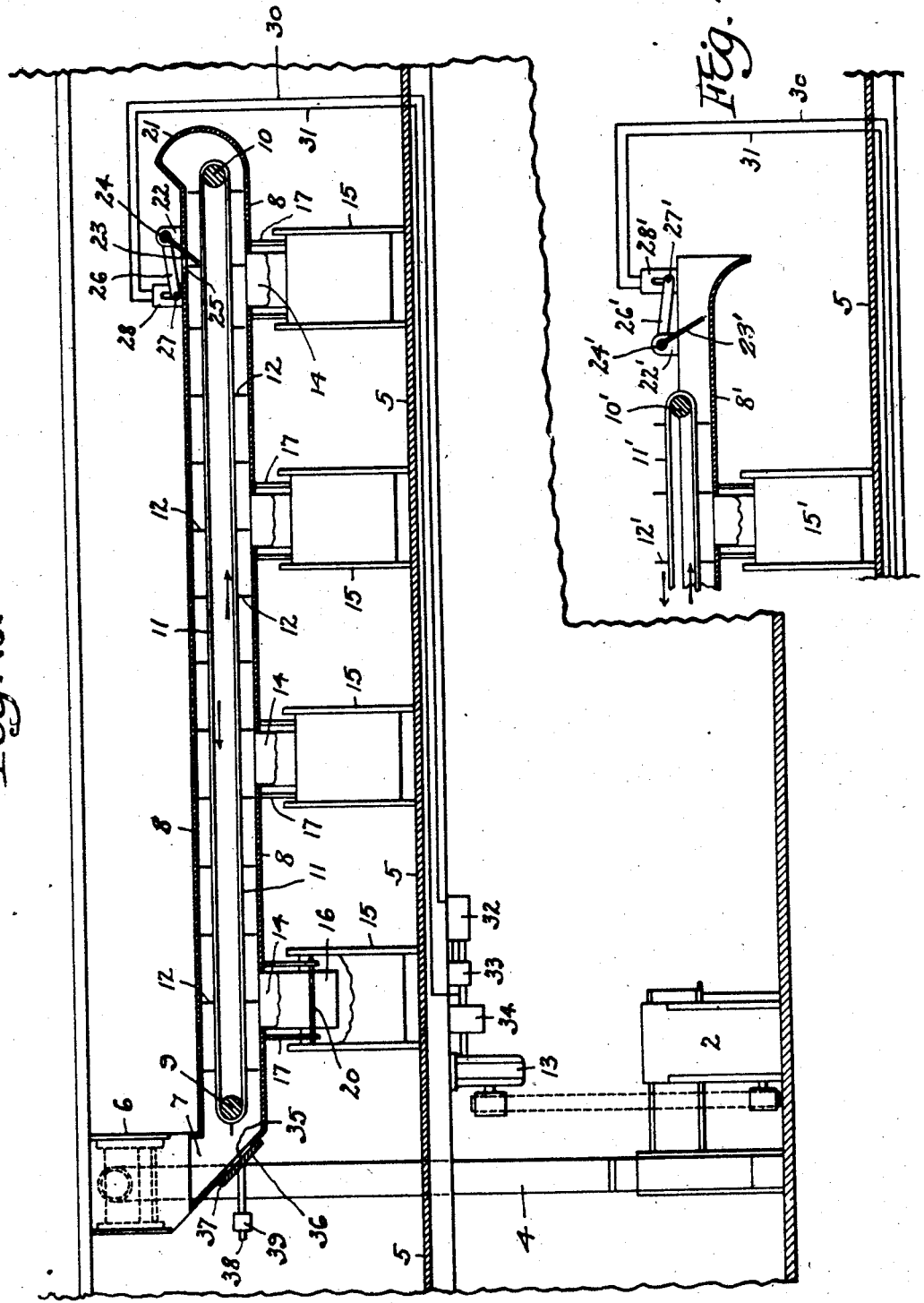

Feb. 28, 1933.  J. B. BRENNEN  1,899,791
RETURN TYPE RAKE DISTRIBUTOR AND ELECTRIC CONTROL
Filed Sept. 19, 1930    3 Sheets-Sheet 3
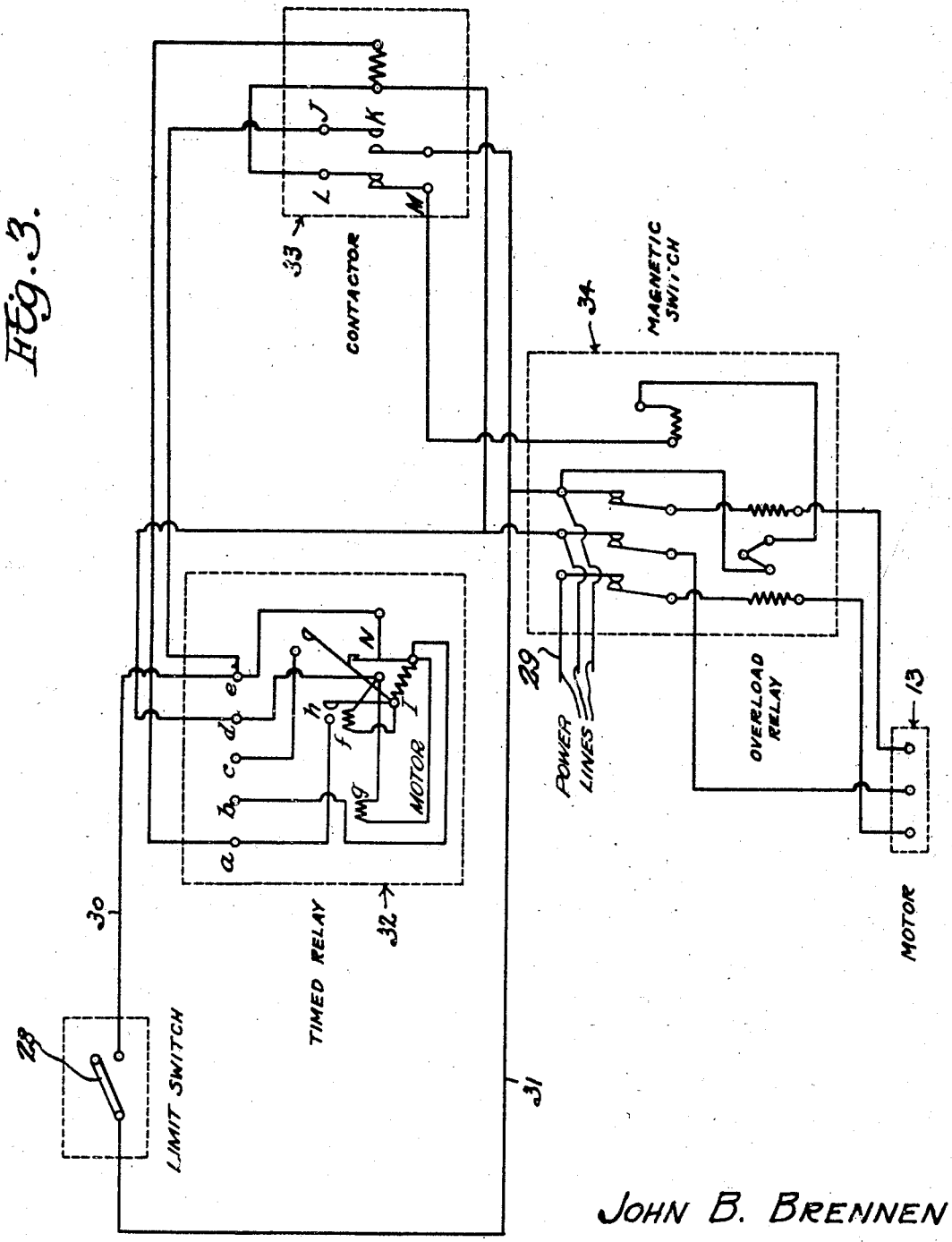
John B. Brennen
INVENTOR
BY Victor J. Evans
ATTORNEY
WITNESS:

Patented Feb. 28, 1933

1,899,791

UNITED STATES PATENT OFFICE

JOHN B. BRENNEN, OF ATLANTA, GEORGIA

RETURN TYPE RAKE DISTRIBUTOR AND ELECTRIC CONTROL

Application filed September 10, 1930. Serial No. 483,121.

This invention relates to an automatic control for a cotton handling machine and has as its primary object to provide an automatic control whereby the difficulties encountered in the handling of cotton in a cotton mill, are avoided. For example, the first process in a cotton mill consists of removing the ties and bagging from the bales and feeding the cotton to feed hoppers or bale breakers which loosen the fibre to some degree and deliver it to opening and cleaning machines which further loosen the fibre and free it from dirt and other extraneous materials. The cotton is delivered from the opening and cleaning machines to the pipe line through which it is conveyed by air to the condenser placed overhead in the picker room. The condenser drops the cotton to the distributor which delivers it to the hoppers of the pickers. If the cleaning machines deliver more cotton to the condenser than the hoppers of the individual pickers will handle, the excess cotton is either spilled on the floor, dropped into the hopper supplying the last picker in the line or delivered into pneumatic suction line at the discharge end of the distributor and returned to the conveyor pipe line at any point between the cleaning machine and condenser.

In an effort to keep the excess of cotton at a minimum and to regulate the delivery of the cotton to the hoppers supplying the individual pickers, several controls have been developed, all employing some form of feeler mechanism in the individual hoppers supplying the pickers. This feeler mechanism operates the delivery gate of the belt distributors and the necessary electric switches for automatically stopping and starting the motor driving the hopper or bale breaker supplying cotton to the cleaning machines. When all of the hoppers supplying the pickers are filled with cotton, the feeler mechanism operates the switches and stops the motor driving the hopper or bale breaker supplying cotton to the cleaning machine, and, when the level of cotton in any of the hoppers supplying the pickers falls sufficiently low, the feeler mechanism and switches start the motor driving the hopper or bale breaker supplying cotton to the cleaning machine. The result is that when the cotton is at the maximum height in the hoppers supplying the pickers, more cotton is carried upward by the needle lifting apron of the hoppers and delivered to the pickers than is the case when the cotton is at the minimum height, hence the pickers cannot do as uniform work as they would if the amount of cotton being delivered to them did not vary.

In view of the foregoing explanation of the difficulties attending the handling of cotton by the ordinary mechanism employed for this purpose, the present invention has as one of its objects to provide an apparatus which will take care of any excess cotton delivered from the cleaning machine which supplies cotton to the distributor so as to prevent the accumulation of cotton at any point in the mechanism where it would be liable to damage or cause interruption to the operation.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:

Figure 2 is a similar view looking at the mechanism from another point of view.

Figure 3 is a diagrammatic view illustrating the electric circuits by which the cotton handling mechanism is controlled.

Figure 4 is a fragmentary vertical sectional view illustrating the control mechanism of the invention installed in a single trough or non-return type of distributor.

Figure 1:
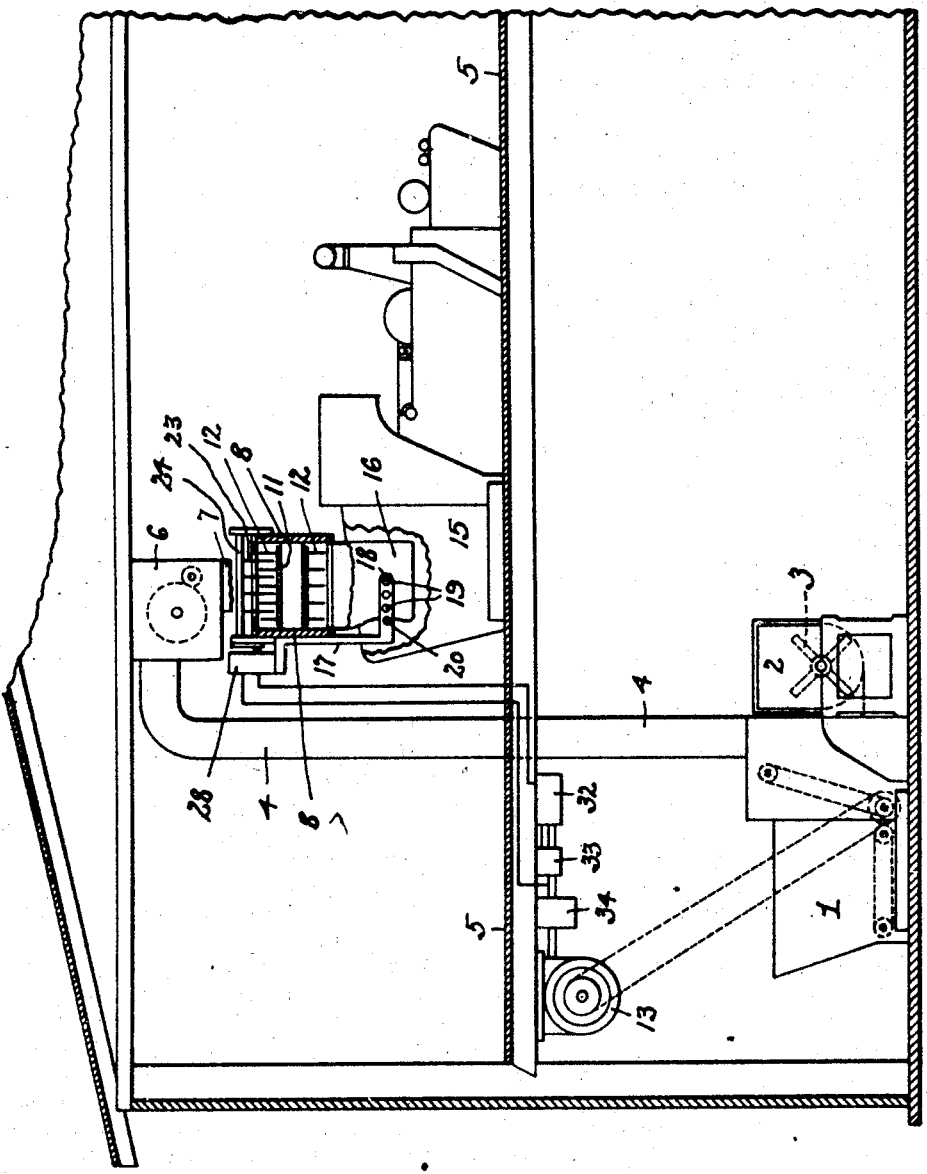
Figure 1 is a view in elevation illustrating the automatic electric control mechanism of the invention and so much of a cotton distributing and handling machine as is necessary to an understanding of the invention.

In the drawings the numeral 1 indicates a hopper which is preferably positioned upon a ground floor or a lower floor of the cotton mill in which the mechanism is installed and mounted in juxtaposition to this hopper is a cleaning machine 2 into which the cotton is delivered from the hopper after the ties and bagging have been removed from the bales, and the uncovered cotton has been delivered into the hopper. This cleaning machine includes a fan or blower 3, and a pipe line or flue 4 leads from the cleaning machine upwardly through the ceiling 5, and is connected or placed in communication with a condenser 6 which is mounted at an elevated position in the room above the room in which the hopper and cleaning machine are installed. From this condenser, the cotton is delivered through a spout 7, into a longitudinally extending trough 8 which is preferably closed at both its top and bottom as well as at its sides, and shafts 9 and 10 are mounted in the ends of this trough and an endless distributor belt 11 is trained over these shafts and rake teeth 12 are mounted upon the belt at the outer surface thereof and are arranged in a plurality of equidistantly spaced transverse series. An electric motor 13 is mounted preferably at the ceiling 5 of the first mentioned room of the mill and power is supplied, by this motor, to operate certain parts of the mechanism.

The bottom of the trough 8 is formed at intervals with openings 14 which are of rectangular form and beneath each opening and upon the floor of the room in which the trough is installed there is arranged a hopper 15, and a chute 16 of flexible material is suspended at its upper end in position to surround each opening 14 and to descend into the respective one of the hoppers 15, and in order that the dimensions of the delivery end of each chute may be more or less restricted, when desired, brackets 17 are mounted upon one side wall of the trough and are provided with right angularly extending arms 18 at their lower ends, these arms extending below the trough and being arranged in pairs, and the brackets and arms of each pair being arranged at opposite sides of the respective chute 16 and within the respective hopper 15. The arms 18 are formed each with a series of openings 19 and a rod 20 is fitted at its ends in these openings, interchangeably, and it will now be evident and particularly by reference to Figure 1 of the drawings that by inserting the ends of the rods 20 in different corresponding ones of the openings 19, of each pair of the arms, the position of the rod may be varied so as to more or less restrict the delivery end of the respective chute. At this point it will be evident that, in the travel of the endless belt, consisting of the distributor, in the direction indicated by the arrows in Figure 2, the lower stretch of the endless distributor will travel above the bottom of the trough 8 and with the teeth 12 in substantial contacting relation to the upper side of the said bottom so that cotton delivered into the trough through the spout 7, will be carried toward the end of the trough opposite the end at which the spout is located, and in its passage, will pass the openings 14 in the bottom of the trough.

When the first hopper 15 has been substantially filled with cotton, the cotton will be conveyed, by the rake teeth 12, past the opening for the first hopper and delivered through the next opening 14 into the respective hopper, and so on throughout the entire series of hoppers.

When all of the hoppers have been filled, all the cotton which passes the opening 14 communicating with the last hopper in the series, will be carried about the adjacent closed end 21 of the trough, or, if for any reason the cotton is not properly conveyed and some of it is carried in this direction, an automatic switch will be actuated in a manner which will now be described.

The numeral 22 indicates brackets which are mounted upon the upper side of the trough and the numeral 23 indicates feeler stems which extend downwardly from a shaft 24, mounted in said brackets and through an opening 25 in the top of the trough, and therefore in the path of movement of any cotton carried past the opening 25 by the teeth 12. Fixed upon one end of the shaft 24 is an arm 26, the latter being pivotally connected as at 27 with the actuating member of a limit switch 28 which is in circuit with a source of current supply, the power lines of which are indicated at 29 in Figure 3 of the drawings. Conductor wires 30 and 31 lead from this switch 28 and the wire 30 leads to a standard type of constant speed induction motor timed relay 32 having the terminals $a$, $b$, $c$, $d$ and $e$ respectively, the terminals $b$ and $c$ being vacant and not used, and the wire 31 to a contactor 33 and a magnetic switch 34, these electrical units being arranged at one side of the motor 13. Swinging of the feeler arms 23 effects closing of the limit switch 28 and this results in delivery of current to the timed relay 32 and contactor 33 which is set in operation and, as long as this contactor is in operation, the limit switch 28 may be opened and closed any number of times without effecting any change in the circuit until the timed relay 32 has completed its timing cycle.

This is accomplished by the normally open contact of the contactor 33 which cuts off the circuit through the switch 28. When the normally open contact of the contactor 33 is closed, the normally closed contact is opened and the magnetic switch 34 will be cut out and thus cut off the circuit to the motor 13 for the period of time to which the time relay 32 is set, and when the time relay completes its timing cycle, the circuit is opened to the contactor 33 and the magnetic switch 34 will then be energized and establish a supply of current to the motor 13. In other words, when the limit switch 28 contacts are closed the time relay coils *f* and *g* are energized. This closes contact *h* with pole *i* in the time relay which energizes the control contactors 33. The normally open contact *k* to pole *j* of the control contactor 33 closes, forming a holding circuit around limit switch contacts 28; also normally closed contact *m* with pole L of the control contactor 33 opens, which deenergizes holding coil of magnetic switch, thereby stopping motor 13 until the time relay has completed its cycle. At the end of this time contact *n* of the time relay is open which resets said relay, thus opening circuit and deenergizing control contactor 33. This opens the holding circuit around limit switch 28 and closes the circuit for reenergizing holding coil of magnetic switch 34, whereupon the motor 13 restarts and operates until the limit switch 28 contacts are again closed, after which the devices operate again as above outlined.

In order to prevent damage to the mechanism if the electric control should for any reason fail to operate, the spout 7 is provided in its downwardly inclined wall with an opening 35 which is preferably of rectangular form and a gate 36 is hingedly mounted at its upper edge as at 37 upon the outer side of the said wall above the opening 35, and an arm 38 extends rearwardly from the gate and a counterbalancing weight 39 is mounted upon this arm and preferably adjustable thereon, so that if a surplus amount is carried rearwardly by the upper stretch of the conveyor 11 and delivered into the spout 7, its weight and the pressure exerted thereagainst will provide for automatic opening of the gate 36 to permit the same to drop onto the surface of the floor 5.

In the embodiment of the invention shown in Figure 4, the cotton is conducted in one direction only and by way of the lower stretch of a conveyor operating in a trough and as the parts illustrated in this figure are identical with corresponding parts shown in Figure 2, except for the difference in location of the parts, the same reference numerals will be employed in Figure 4, primed, to designate corresponding parts in Figure 2.

The conveyor stretch 11' passes above the bottom of the trough 8' and Figure 4 illustrates that end of the endless conveyor which extends beyond the last one of the hoppers 15', and therefore there is no return of a surplus amount of cotton as in the previously described embodiment. On the other hand, the limit switch 28', its actuating arm 26' and the brackets 22' are mounted at the open top of the trough 8' near the delivery end thereof, the feeler stems 23' being positioned immediately opposite and close to the delivery end of the endless conveyor, so that, in the event there is any surplus cotton delivered at this point instead of into the hopper 15', or, as a result of this hopper being completely filled, the cotton will engage against the feeler stems 23' and rock the shaft 24' to effect upward swinging of the arm 26' and actuation of the limit switch 28' to break the circuit and stop the apparatus until the cotton has been collected and properly disposed.

What I claim is:

1. In an automatic electric control for a cotton handling machine, the combination with a cotton cleaning machine, an electric motor, a circuit, of a distributor unit comprising a trough to receive cotton from the cleaning machine, an endless distributor operating therein, the said distributor having transverse series of rake teeth to draw the cotton delivered to the trough, over the bottom thereof, and a series of hoppers to receive cotton delivered from the trough in its passage therethrough, of a feeler positioned to be engaged by surplus cotton carried by the distributor to its upper stretch, upon filling of the hoppers, a limit switch in said circuit and actuated by the movement of the feeler, and a timed relay in circuit with the limit switch for maintaining the motor out of operation for a predetermined time, independent of the actuation of the feeler.

2. In an automatic electric control for a cotton handling machine, the combination with a cotton cleaning machine, an electric motor, a circuit, of a distributor unit comprising a trough to receive cotton from the cleaning machine, an endless distributor operating therein, the said distributor having transverse series of rake teeth to draw the cotton delivered to the trough over the bottom thereof, and a series of hoppers to receive cotton delivered from the trough in its passage therethrough, of a feeler positioned to be engaged by surplus cotton carried by the distributor to its upper stretch, upon filling of the hoppers, a limit switch actuated by the movement of the feeler, a timed relay in circuit with the limit switch for maintaining the motor out of operation for a predetermined time, independent of the actuation of the feeler, and a contactor and magnetic switch in circuit with each other and with the timed relay.

3. In an automatic electric control for a cotton handling machine, the combination with a cotton cleaning machine, an electric motor, a circuit, of a distributor unit comprising a trough, to receive cotton from the cleaning machine, an endless distributor operating therein, the said distributor having transverse series of rake teeth to draw the cotton delivered to the trough, over the bottom thereof, and a series of hoppers to receive cotton delivered from the trough in its passage therethrough, of a feeler positioned to be engaged by surplus cotton carried by the distributor, to its upper stretch, upon filling of the hoppers, a limit switch, the feeler being supported for swinging movement, and means movable with the feeler and operatively connected with the limit switch, and a timed relay in circuit with the limit switch for maintaining the motor out of operation for a predetermined time, independent of the actuation of the feeler.

4. In an automatic electric control for a cotton handling machine, the combination with a cotton cleaning machine, an electric motor, a circuit, of a distributor unit, comprising a trough to receive cotton from the cleaning machine, an endless distributor operating therein, the said distributor having transverse series of rake teeth to draw the cotton delivered to the trough, over the bottom thereof, and a series of hoppers to receive cotton delivered from the trough in its passage therethrough, the bottom of the trough having an opening above each of the hoppers, a chute of flexible material surrounding, at its upper end, each of the openings, a pair of brackets extending downwardly from the bottom of the trough at the sides of each opening, and a rod mounted upon the brackets and extending transversely of the respective chute and adjustable upon the brackets and with respect to the chute to vary the size of the delivery end of the chute, of a feeler positioned to be engaged by surplus cotton carried by the distributor, to its upper stretch, upon filling of the hoppers, a limit switch actuated by the movement of the feeler and a timed relay in circuit with the limit switch for maintaining the motor out of operation for a predetermined time, independent of the actuation of the feeler.

5. In an automatic electric control for a cotton handling machine, the combination with a cotton cleaning machine, an electric motor, a circuit, of a distributor unit comprising a trough to receive cotton from the cleaning machine, an endless distributor operating therein, the said distributor having transverse series of rake teeth to draw the cotton delivered to the trough, over the bottom thereof, and a series of hoppers to receive cotton delivered from the trough in its passage therethrough, of a feeler positioned to be engaged by surplus cotton carried by the distributor, a limit switch actuated by the movement of the feeler, and a timed relay in circuit with the limit switch for maintaining the motor shut off for a predetermined time, independent of the actuation of the feeler.

6. In an automatic electric control for a cotton handling machine, the combination with a cotton cleaning machine, an electric motor, a circuit, of a distributor unit comprising a trough to receive cotton from the cleaning machine, an endless distributor operating therein, the said distributor having transverse series of rake teeth to draw the cotton delivered to the trough, over the bottom thereof, and a series of hoppers to receive cotton delivered from the trough in its passage therethrough, of a feeler positioned to be engaged by surplus cotton carried by the distributor to its upper stretch, upon filling of the hoppers, a limit switch actuated by the movement of the feeler, a timed relay in circuit with the limit switch for maintaining the motor out of operation for a predetermined time, independent of the actuation of the feeler, a spout, at the delivery end of the upper stretch of the conveyor, having an inclined bottom provided with an opening, a gate for closing said opening, and a counterweight for holding the gate normally closed.

In testimony whereof I affix my signature.

JOHN B. BRENNEN.